United States Patent [19]

Dunn

[11] Patent Number: 4,478,628
[45] Date of Patent: Oct. 23, 1984

[54] METHOD FOR CONTROLLING THE LEVEL OF MOLTEN MATERIAL IN A FURNACE

[75] Inventor: Charles S. Dunn, Pataskala, Ohio

[73] Assignee: Owens-Corning Fiberglas Corporation, Toledo, Ohio

[21] Appl. No.: 405,658

[22] Filed: Aug. 5, 1982

[51] Int. Cl.³ .............................................. C03B 3/00
[52] U.S. Cl. ........................................ 65/29; 65/136; 65/162; 65/164; 65/335
[58] Field of Search ................ 65/135, 136, 162, 164, 65/335, 347, 29

[56] References Cited

U.S. PATENT DOCUMENTS

| | | | |
|---|---|---|---|
| 1,905,534 | 4/1933 | Wadman | 65/335 X |
| 3,380,463 | 4/1968 | Trethewey | 137/4 |
| 3,476,538 | 11/1969 | Trethewey | 65/335 X |
| 4,385,918 | 5/1983 | Dunn | 65/335 X |

*Primary Examiner*—Arthur Kellogg
*Attorney, Agent, or Firm*—Ronald C. Hudgens; Patrick P. Pacella

[57] ABSTRACT

Controlling the level of molten material in a melting furnace is disclosed. The level of molten material is sensed downstream of the furnace and batch materials are choke fed to keep the total batch crust plus molten glass depth constant. This provides for simpler molten glass level control as melter power can be directly controlled in response to glass level.

3 Claims, 1 Drawing Figure

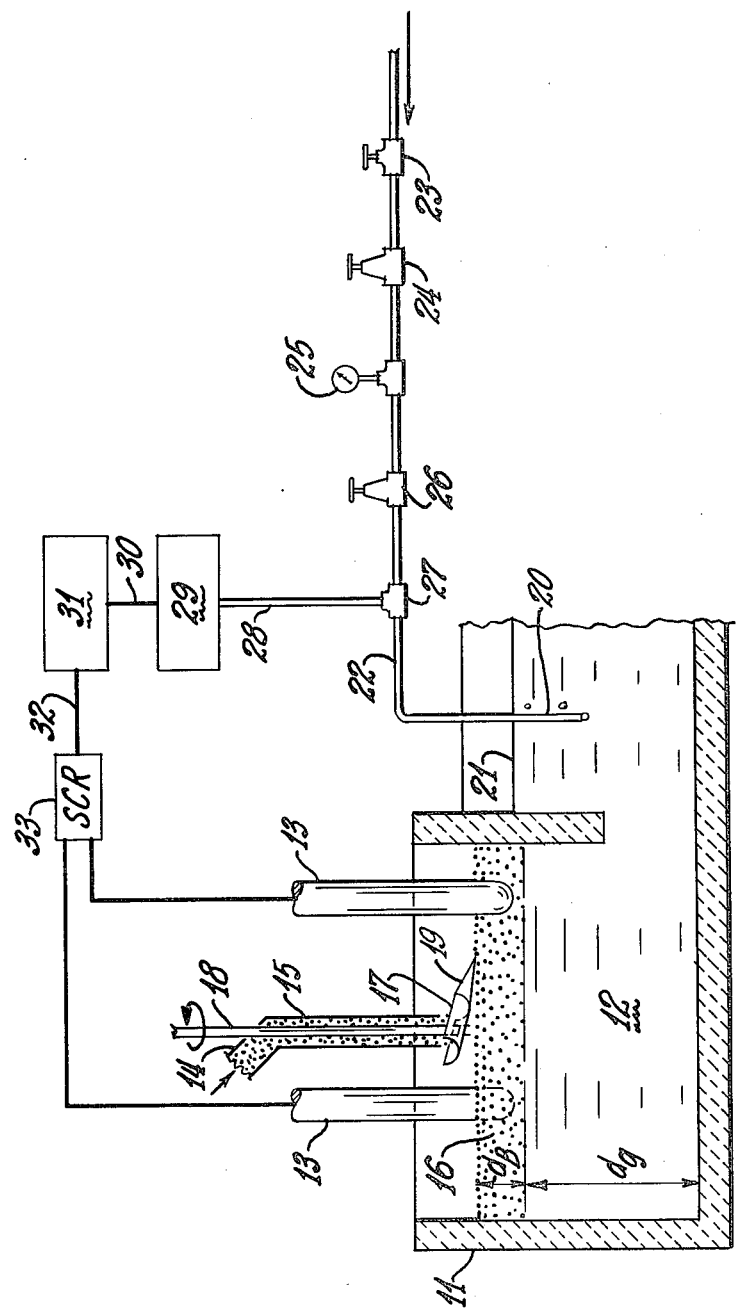

METHOD FOR CONTROLLING THE LEVEL OF MOLTEN MATERIAL IN A FURNACE

TECHNICAL FIELD

This invention relates to controlling the level of molten material in a melting furnace. More specifically, it relates to controlling the level of molten material in the furnace by choke feeding batch materials to the furnace and by sensing the level of molten material downstream of the furnace, i.e., sensing the level in the forehearth.

BACKGROUND ART

Arc-type melting furnaces have been proposed in the past for the melting of glass batch, slag, minerals, and other pulverant raw materials.

Typically, the arc is generated beneath a raw material layer or "blanket" which encompasses the lower ends of vertical electrodes and which forms an insulating top layer over the molten material in the furnace. Melting primarily takes place at the location of the spaced electrodes beneath the raw material blanket, and those raw materials which are located at the arcing locations melt more quickly and preferentially with respect to other portions of the batch blanket.

Arc stability and melting efficiency requires that a body of unmelted batch be constantly present at each of the arcing locations. Thus, the prior art formation of batch material or batch blanket of substantially equal depth across the top of the molten materials has resulted in the melting of that limited amount of material at each arcing location, and the batch material from other portions of the blanket is either inefficiently melted or must flow to the arcing location before it can be melted.

I have developed more efficient means and methods for batch material distribution to promote arc stability and melting efficiency. I have found that, in addition to a uniform blanket to batch material, a uniform level of molten material in the furnace also may be achieved. Because of the choke feed, melter power is controlled in direct response to any change in glass level.

DISCLOSURE OF INVENTION

My present invention provides for controlling the level of molten material in an arc melting furnace. Batch materials are choke fed to keep the total batch crust plus molten glass depth ($d_b + d_g$ in the FIGURE) constant. This allows for improved molten glass level control. Maintaining a uniform batch crust thickness helps promote arc stability and melting efficiency. Controlling glass level in the forehearth helps maintain a constant flow rate from the bushings and keeps level fluctuation from washing and eroding the refractory sidewalls of the furnace.

More specifically, and in its preferred form, the present invention proposes the gravitational feeding of batch material to a furnace through a vertical feed chute which terminates inside the furnace at a location on or near the batch blanket. Material from the chute is distributed internally of the furnace by means of a rotatable trough which receives the material from the chute and which directs it laterally onto the blanket. The trough rotates about the vertical axis and has a spreader bar attached to it. Since the chute is filled with batch at all times, a continuous stream of batch material literally rests on or is supported by the trough at the upper surface of batch crust. As the batch material is melted at the arc electrodes, the rotating motion of the spreader bar adds additional material as needed. This operation continues at all times and is sufficient to compensate for the amount of batch which is melted at the arc eloctrodes.

At the same time, the level of molten material downstream of the furnace is sensed to provide a signal corresponding to variations of level in the body of molten material. In response to this signal, there is an increase in heat input to the furnace when the downstream level of molten material decreases and a decrease in the heat input to the furnace when the downstream level of molten material increases. This method will work for controlling level in either a conventional joule effect, electric furnace or in an arc melter.

In an arc melting furnace, the electrodes must be raised and lowered independently of one another with varying furnace operating conditions, e.g., as the resistance of the arc changes upon variations in the molten material level and the molten material temperature, as the electrode is consumed, and as cooler incoming raw materials are fed into the furnace. As a result, the electrodes are frequently moved up and down as they individually hunt for the desired balance point. Prior to the present invention, various forms of controls have been proposed, but such controls have been cumbersome, expensive, and complicated. This invention simplifies molten material level control by providing a positive response to heat input based on direct measurement of level provided the melter surface is relatively uniformly choke fed with batch.

BRIEF DESCRIPTION OF DRAWINGS

The FIGURE is a side elevational view of a melting furnace equipped with the level control of this invention.

BEST MODE OF CARRYING OUT INVENTION

We conveniently will describe the level control of this invention by the arrangement disclosed in the FIGURE. While this invention has been illustrated by this arrangement, it also may take a variety of other forms. For example, while the level control was designed for an arc melting furnace, it may also be used with a furnace which employs joule effect heating. Microwave or other electronic means may be used in place of the bubbler probe for level detection.

The FIGURE generally shows a conventional arc melting furnace indicated by reference numeral 10 having refractory sidewall 11 containing a body 12 of molten material, for example, glass batch, basalt or the like. Arc electrodes 13 vertically extend into furnace 10 and terminate slightly above the body 12 of molten material. Each electrode 13 defines an arcing location at its lower end.

Batch materials 14 are supplied to furnace 10 by chute 15 supported by appropriate support means not shown. Chute 15 is essentially filled with batch materials 14 at all times. As a result of this choke feed, batch material 14 provides a plug flow to batch blanket 16. Chute 14 extends into furnace 10 and terminates near the upper surface of batch blanket 16. In this manner, batch material 14 typically piles up on trough 17 on or near the surface of batch blanket 16. A rotatable shaft 18 extends axially through chute 15 and is driven by a means and motor, not shown. Fixed to the lower end of shaft 18 is trough 17, which preferably is formed of sheet metal and is "U" shaped in cross-section to provide an upwardly facing interior surface. Spreader bar 19 extends from trough 17 and provides an outwardly flare for spreading batch material uniformly on blanket 16.

Bubbler probe 20, which has its open end immersed beneath surface 21 of the body of molten material 12, is supplied with a constant volumetric flow of air or other suitable gas, the gas fluctuating in pressure dependent upon the head of molten material or distance of the molten material level above a fixed position. For this purpose, an air supply line 22, connected to a suitable source of supply (not shown) is joined to probe 20.

In air supply line 22, there is first provided a service valve 23 followed by pressure regulator 24. The function of pressure regulator 24 is to stabilize the input and to isolate the system from pressure distrubances on the main supply line. Following pressure regulator 24, I have provided gauge 25 to enable the operator to adjust pressure regulator 24 to a desired level. Following pressure gauge 25 is constant volumetric flow controller 26.

At connector 27, branch line 28 leads to transmitter 29. A principal component of transmitter 29 is a pressure detector which generates a pressure signal. Typically, the signal is amplified and carried by line 30 to a recorder/controller 31. The signal then is carried by line 32 to SCR 33 which increases or decreases the power input to electrode 13 depending upon the level of molten material in the forehearth.

INDUSTRIAL APPLICABILITY

The invention consists of a stationary feed pipe through which batch is choke fed into the furnace. At the end of the feed pipe there is an angled trough and a curved spreader bar. The trough and spreader bar are rotated by means of a motor located above the static feed chute. As batch material is melted at the arc electrode, the rotating motion of the trough and the spreader bar add additional batch material as needed. Choke feeding raw materials in this manner also keeps the total batch crust plus glass depth thickness ($d_b + d_g$ in the FIGURE) constant. This allows for molten glass level control which uses feedback control from a forehearth bubbler control forehearth glass level via modulating the arc power input.

In operation, the batch is heaped or piled around trough 17 and then spread uniformly on blanket 16 filling any voids in the surface usually at the arc electrodes. This operation is continuous and provides a constant uniform batch cover to the molten material.

In the utilization of arc melting furnaces for the melting of basalt, glass batch, metals or the like, or for ore reduction, the charge to be melted is introduced in pulverant form into a furnace or crucible having a plurality of top-entering, vertically suspended electrodes. The electrodes typically are pre-baked, cylindrical carbon sections which are screwed together and which are consumed during the melting process.

The electrical current is supplied to the electrodes, typically three in number, from a transformer as the electrodes are individually suspended in the furnace or crucible for independent vertical displacement. The electrodes are individually adjusted vertically to maintain a constant voltage at each electrode-batch interface location, and the amperage varies as the resistance in the furnace changes.

The electrodes must be raised and lowered independently of one another with varying furnace operating conditions, e.g., as the resistance of the arc changes upon variations in the molten material level and the molten material temperature, as the electrode is consumed, and as cooler incoming raw materials are fed into the furnace. As a result, the electrodes are frequently moved up and down as they individually hunt for the desired balance point. Prior to the present invention, a stable arc and efficiency of melting was at least partially dependent upon batch blanket.

Air or other suitable gas is introduced at a constant volumetric flow rate at a fixed point in a body of molten glass contained within the bubbler. Intermittent individual gas bubbles are caused to be formed which rise in succession to the surface of the body of glass. Thus, the open end of the immersed probe is never exposed to the atmosphere to provide large pressure drops; accordingly the glass head is recorded as a substantially smooth curve. In a particular embodiment of the present invention, the downwardly extending end of the immersed probe comprised a high temperature-resistant tube of ¼ inch outside diameter and having a wall thickness of 0.02 inch. With the lower end of the tube inserted from about 1 to about 2 inches below the surface of the molten glass, air was delivered at a rate forming approximately 20 to 30 discrete bubbles per minute. Bubbles are formed as the result of the relationship of molten glass viscosity, the small size of the probe and the low pressure at which the gas is supplied to the probe. As the glass level changes, a corresponding change in pressure required to form bubbles is effected. This pressure change is reflected through the line to the transmitter.

The signal generated by the transmitter is fed into an amplifier and is directed as amplified output to a recorder controller. Recorder controller provides a control signal for varying power input rate of input being accurately correlated to changes in the level thereof.

The apparatus of the present invention provides very sensitive control furnace operations. Because of the choke feed, power input is directly responsive to glass level. Holding glass level relatively constant in the forehearth helps maintain a constant flow rate and keeps level fluctuations in the furnace to a minimum thereby preventing washing and erosion of the refractory sidewalls.

This concept may be employed with the arc furnace shown or a furnace built of refractories and having spaced electrical resistance heating elements immersed in the body of glass contained therein with the glass itself forming a part of the electrical heating circuit. This would also include melting chambers or bushings as used in the production of glass fibers wherein the bushing is made of a high temperature resistant metal alloy and electricity is passed therethrough to provide resistance heating and melting of glass contained within the bushing.

I claim:

1. A process for controlling the level of molten material in a melting furnace containing a body of molten material with a blanket of unmelted batch material on the surface thereof including the steps of:
   continuously choke feeding batch material to the furnace at or near the upper surface of the batch blanket at all times so that a continuous stream of batch material essentially rests or is supported at the upper surface of the batch blanket,
   sensing the level of molten material downstream of the melting furnace, said sensing producing a signal which is responsive to the downstream level of molten material, and in response to the signal, increasing or decreasing the level of molten material in the furnace when the downstream level of molten material changes.

2. A process for controlling the level of molten glass in a glass melting furnace containing a body of molten glass with a blanket of unmelted glass batch on the surface thereof including the steps of:

continuously choke feeding glass batch to the furnace at or near the upper surface of the batch blanket at all times so that a continuous stream of batch material essentially rests or is supported at the upper surface of the batch blanket, sensing the level of molten glass in a forehearth downstream of the melting furnace, said sensing producing a signal which is responsive to the level of molten glass in the forehearth, and in response to the signal, increasing in heat input to the furnace when the level of molten glass in the forehearth decreases and decreasing in the heat input to the furnace when the level of molten glass in the forehearth increases.

3. A process for controlling the level of molten glass in an arc melting furnace containing a body of molten glass with a blanket of unmelted glass batch on the surface thereof and having a plurality of arcing locations defined by vertical arc electrodes including the steps of:

continuously choke feeding glass batch to the furnace at or near the upper surface of the batch blanket at all times so that a continuous stream of batch material essentially rests or is supported at the upper surface of the batch blanket, spreading the glass batch on the batch blanket extending keeping the batch blanket and molten material at a constant thickness, discharging a constant flow volumetric stream of gas into the body of molten glass at a submerged level below the surface in a series of discrete bubbles to produce a back pressure in the stream of gas sensing the back pressure to provide a signal corresponding to variations of level in the body of molten glass, and in response to the signal, increasing in heat input to the furnace when the level of molten glass in the forehearth decreases and decreasing in the heat input to the furnace when the level of molten glass in the forehearth increases.

* * * * *